United States Patent
Wadhawan et al.

(10) Patent No.: US 7,624,235 B2
(45) Date of Patent: Nov. 24, 2009

(54) CACHE USED BOTH AS CACHE AND STAGING BUFFER

(75) Inventors: Ruchi Wadhawan, Sunnyvale, CA (US); Jason M. Kassoff, Denver, CO (US); George Kong Yiu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 493 days.

(21) Appl. No.: 11/565,391

(22) Filed: Nov. 30, 2006

(65) Prior Publication Data

US 2008/0133843 A1    Jun. 5, 2008

(51) Int. Cl.
*G06F 13/00* (2006.01)
*G06F 12/00* (2006.01)

(52) U.S. Cl. .................. 711/129; 711/113; 711/118

(58) Field of Classification Search .............. None
See application file for complete search history.

(56) References Cited

U.S. PATENT DOCUMENTS

| | | | |
|---|---|---|---|
| 5,263,142 A | 11/1993 | Watkins et al. | |
| 5,706,467 A * | 1/1998 | Vishlitzky et al. | ........... 711/129 |
| 6,085,263 A | 7/2000 | Sharma et al. | |
| 6,295,582 B1 | 9/2001 | Spencer | |
| 6,772,295 B2 | 8/2004 | Spencer et al. | |

OTHER PUBLICATIONS

P.A. Semi, "The PWRficient Processor Family," Oct. 2005, pp. 1-31.
* cited by examiner

*Primary Examiner*—Reginald G Bragdon
*Assistant Examiner*—Baboucarr Faal
(74) *Attorney, Agent, or Firm*—Lawrence J. Merkel; Meyertons, Hood, Kivlin, Kowert & Goetzel, P.C.

(57) ABSTRACT

In one embodiment, a cache comprises a data memory comprising a plurality of data entries, each data entry having capacity to store a cache block of data, and a cache control unit coupled to the data memory. The cache control unit is configured to dynamically allocate a given data entry in the data memory to store a cache block being cached or to store data that is not being cache but is being staged for retransmission on an interface to which the cache is coupled.

17 Claims, 5 Drawing Sheets

| Free List Value | Cache State | Entry State |
|---|---|---|
| Free | X | Available |
| Allocated | Invalid | Staging Buffer |
| Allocated | Valid | Cache |

| Free List Value | Cache State | Entry State |
|---|---|---|
| Free | X | Available |
| Allocated | Invalid | Staging Buffer |
| Allocated | Valid | Cache |

CACHE USED BOTH AS CACHE AND STAGING BUFFER

BACKGROUND

1. Field of the Invention

This invention is related to the field of caches.

2. Description of the Related Art

Caches are included in systems to reduce the latency of read/write operations from data consumers such as processors and other devices in computer systems (where a data consumer reads data from the main memory in the system, and sometimes writes data to memory as well). Typically, a cache has a relatively small capacity compared to the main memory, and high speed memory is used to build the cache. Data recently accessed by the data consumer(s) is typically stored in the cache, in units of cache blocks. That is, cache storage is typically allocated and deallocated in cache-block-sized units. The cache blocks are address aligned to natural cache block boundaries in the memory address space.

In addition to caches, buffering is typically provided in the system, between the data consumer(s) and the cache and/or between the cache and the memory system. Buffers are used to temporarily stage data for transfer. Such buffers are often costly in both area and latency.

SUMMARY

In one embodiment, a cache comprises a data memory comprising a plurality of data entries, each data entry having capacity to store a cache block of data, and a cache control unit coupled to the data memory. The cache control unit is configured to dynamically allocate a given data entry in the data memory to store a cache block being cached or to store data that is not being cached but is being staged for retransmission on an interface to which the cache is coupled.

In an embodiment, a method comprises receiving data in a cache, the data being staged for retransmission on an interface to which the cache is coupled; and dynamically allocating a given data entry in a data memory of the cache to store the staged data, the given data entry having a capacity to store a cache block being cached and also useable to cache the cache block.

BRIEF DESCRIPTION OF THE DRAWINGS

The following detailed description makes reference to the accompanying drawings, which are now briefly described.

Figure 1:
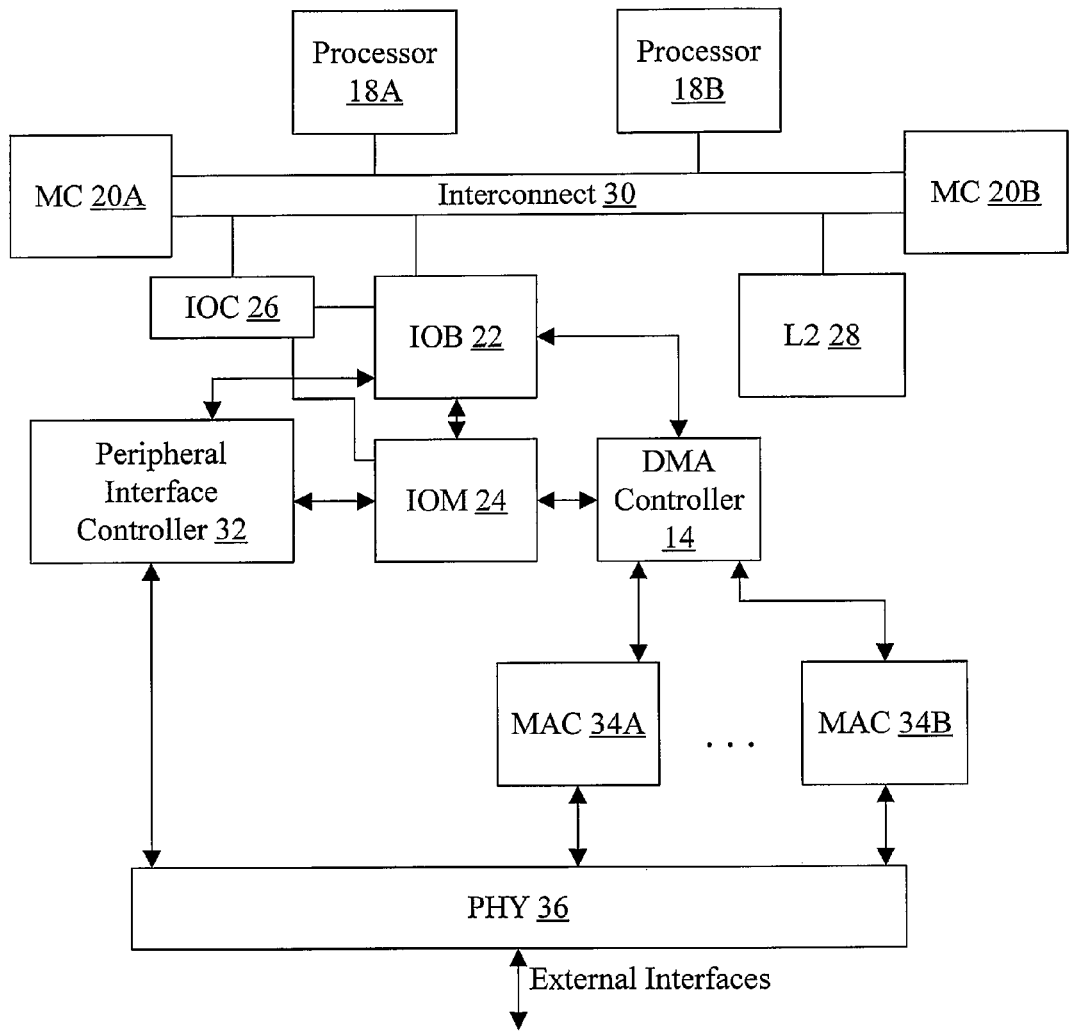
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the illustrated embodiment, the system 10 includes one or more processors such as processors 18A-18B, one or more memory controllers such as memory controllers 20A-20B, an I/O bridge (IOB) 22, an I/O memory (IOM) 24, an I/O cache (IOC) 26, a level 2 (L2) cache 28, an interconnect 30, a DMA controller 14, a peripheral interface controller 32, one or more media access control circuits (MACs) such as MACs 34A-34B, and a physical interface layer (PHY) 36. The processors 18A-18B, memory controllers 20A-20B, IOB 22, IOC 26, and L2 cache 28 are coupled to the interconnect 30. The IOB 22 is further coupled to the IOC 26 and the IOM 24. The IOC 26 is also further coupled to the IOM 24. The DMA controller 14 is also coupled to the IOB 22 and the IOM 24. The MACs 34A-34B are coupled to the DMA controller 14 and to the physical interface layer 36. The peripheral interface controller 32 is also coupled to the I/O bridge 22 and the IOM 24 (and thus indirectly coupled to the DMA controller 14) and to the physical interface layer 36. In some embodiments, the components of the system 10 may be integrated onto a single integrated circuit as a system on a chip. In other embodiments, the system 10 may be implemented as two or more integrated circuits.

The IOC 26 may be a cache for I/O-generated transactions, e.g. from the peripheral interface controller 32 and/or from the DMA controller 14, on behalf of the MACs 34A-34B. The DMA controller 14 may also generate transactions to perform memory to memory DMA copy operations, in one embodiment. Additionally, the IOC 26 may allocate data entries in its data memory to stage data received from the interconnect 30 for retransmission to I/O and/or to stage data received from I/O to be retransmitted on the interconnect 30. More particularly, the IOC 26 may dynamically allocate data entries in the data memory to store a cache block provided in a fill (due to a cache miss) or to store staged data. Data may be viewed as "staged" if it is not being cached for future (and possibly repeated) access, but rather is in transit and is being held only until the data can be transmitted onto the target interface. In contrast, cached data generally remains cached until replaced by more recently accessed data (eviction), forced flush for coherency purposes, or explicitly flushed under, e.g., program control.

By using IOC 26 storage for staging data, separate buffering may be avoided. Data may be directly transferred between the data memory of the IOC 26 and the interconnect 30. The number of staging buffers available may also be relatively larger (e.g. some significant percentage of the IOC 26, for example), and may dynamically vary based on the traffic actually experienced in the system 10.

More specifically, in the illustrated embodiment, the IOC 26 may serve to stage data at the boundary between coherent transactions (on the interconnect 30) and non-coherent I/O transactions. The staged data may be flowing in either direction (from the interconnect 30 to I/O or from I/O to the interconnect 30) and may correspond to a transaction sourced either on the interconnect 30 or in an I/O device.

In some embodiments, the IOC 26 may stage data from the interconnect 30 to the I/O components (the peripheral interface controller 32 and the DMA controller 14, in this embodiment). Generally, the IOC 26 may stage data to be transferred from one interface to another interface. In this embodiment, the IOM 24 may be used as a buffer for data being transferred between the IOC 26 and the peripheral interface 32 or the DMA controller 14. Thus, the data path between the interconnect 30 and the DMA controller 14/peripheral interface controller 32 may be through the IOC 26 and the IOM 24. The control path (including read/write requests, addresses in the host address space associated with the requests, etc.) may be between the IOB 22 (and the IOC tags) and the DMA controller 14/peripheral interface controller 32. The IOM 24 may not be included in other embodiments, and the IOM 24 buffering may be completely absorbed into the IOC 26. That is, in such embodiments, the data path may be from the interconnect 30 to the IOC 26 to the DMA controller 14/peripheral interface controller 32.

The processors 18A-18B comprise circuitry to execute instructions defined in an instruction set architecture implemented by the processors 18A-18B. Any instruction set architecture may be implemented in various embodiments. For example, the PowerPC™ instruction set architecture may be implemented. Other exemplary instruction set architectures may include the ARM™ instruction set, the MIPS™ instruction set, the SPARC™ instruction set, the x86 instruction set (also referred to as IA-32), the IA-64 instruction set, etc.

The memory controllers 20A-20B comprise circuitry configured to interface to memory. For example, the memory controllers 20A-20B may be configured to interface to dynamic random access memory (DRAM) such as synchronous DRAM (SDRAM), double data rate (DDR) SDRAM, DDR2 SDRAM, Rambus DRAM (RDRAM), etc. The memory controllers 20A-20B may receive read and write transactions from the interconnect 30 for the memory to which they are coupled, and may perform the read/write operations to the memory. The read and write transactions may include read and write transactions initiated by the IOB 22 on behalf of the DMA controller 14 and/or the peripheral interface controller 32. Additionally, the read and write transactions may include transactions generated by the processors 18A-18B and/or the L2 cache 28.

The L2 cache 28 may comprise a cache memory configured to cache copies of data corresponding to various memory locations in the memories to which the memory controllers 20A-20B are coupled, for low latency access by the processors 18A-18B and/or other agents on the interconnect 30. The L2 cache 28 may comprise any capacity and configuration (e.g. direct mapped, set associative, etc.).

The IOB 22 comprises circuitry configured to communicate transactions on the interconnect 30 on behalf of the DMA controller 14 and the peripheral interface controller 32. The interconnect 30 may support cache coherency, and the IOB 22 may participate in the coherency and ensure coherency of transactions initiated by the IOB 22. In the illustrated embodiment, the IOB 22 employs the IOC 26 to cache recent transactions initiated by the IOB 22. The IOC 26 may have any capacity and configuration, in various embodiments, and may be coherent. The IOC 26 may be used, e.g., to cache blocks of data which are only partially updated due to reads/writes generated by the DMA controller 14 and the peripheral interface controller 32. Using the IOC 26, read-modify-write sequences may be avoided on the interconnect 30, in some cases. Additionally, transactions on the interconnect 30 may be avoided for a cache hit in the IOC 26 for a read/write generated by the DMA controller 14 or the peripheral interface controller 32 if the IOC 26 has sufficient ownership of the cache block to complete the read/write.

The interconnect 30 may comprise any communication medium for communicating among the processors 18A-18B, the memory controllers 20A-20B, the L2 cache 28, and the IOB 22. For example, the interconnect 30 may be a bus with coherency support. The interconnect 30 may alternatively be a point-to-point interconnect between the above agents, a packet-based interconnect, or any other interconnect.

The DMA controller 14 is configured to perform DMA transfers between the interface circuits (e.g. the peripheral interface controller 32 and MACs 34A-34B) and the memory address space. Particularly, the DMA transfers may be between memory locations to which the address space is mapped (in memory attached to the memory controllers 20A-20B, for example) and the interface circuits. Additionally, the DMA controller 14 may, in some embodiments, be configured to perform DMA transfers between sets of memory locations within the address space. That is, both the source and destination of such a DMA transfer may be memory locations. The DMA controller 14 may be configured to perform one or more operations (or "functions") on the DMA data as the DMA data is being transferred, in some embodiments. In one embodiment, some of the operations that the DMA controller 14 performs are operations on packet data (e.g. encryption/decryption, cyclical redundancy check (CRC) generation or checking, checksum generation or checking, etc.). The operations may also include an exclusive OR (XOR) operation, which may be used for redundant array of inexpensive disks (RAID) processing, for example.

The MACs 34A-34B may comprise circuitry implementing the media access controller functionality defined for network interfaces. For example, one or more of the MACs 34A-34B may implement the Gigabit Ethernet standard. One or more of the MACs 34A-34B may implement the 10 Gigabit Ethernet Attachment Unit Interface (XAUI) standard. Other embodiments may implement other Ethernet standards, such as the 10 Megabit or 100 Megabit standards, or any other network standard. In one implementation, there are 6 MACs, 4 of which are Gigabit Ethernet MACs and 2 of which are XAUI MACs. Other embodiments may have more or fewer MACs, and any mix of MAC types.

The peripheral interface controller 32 comprises circuitry configured to control a peripheral interface. In one embodiment, the peripheral interface controller 32 may control a peripheral component interconnect (PCI) Express interface. Other embodiments may implement other peripheral interfaces (e.g. PCI, PCI-X, universal serial bus (USB), etc.) in addition to or instead of the PCI Express interface.

The PHY 36 may generally comprise the circuitry configured to physically communicate on the external interfaces to the system 10 under the control of the interface circuits 16. In one particular embodiment, the PHY 36 may comprise a set of serializer/deserializer (SERDES) circuits that may be configured for use as PCI Express lanes or as Ethernet connections. The PHY 36 may include the circuitry that performs 8 b/10 b encoding/decoding for transmission through the SERDES and synchronization first-in, first-out (FIFO) buffers, and also the circuitry that logically configures the SERDES links for use as PCI Express or Ethernet communication links. In one implementation, the PHY may comprise 24 SERDES that can be configured as PCI Express lanes or Ethernet connections. Any desired number of SERDES may be configured as PCI Express and any desired number may be configured as Ethernet connections.

It is noted that, in various embodiments, the system 10 may include one or any number of any of the elements shown in FIG. 1 (e.g. processors, memory controllers, caches, I/O bridges, DMA controllers, and/or interface circuits, etc.).

Figures 2, 3:
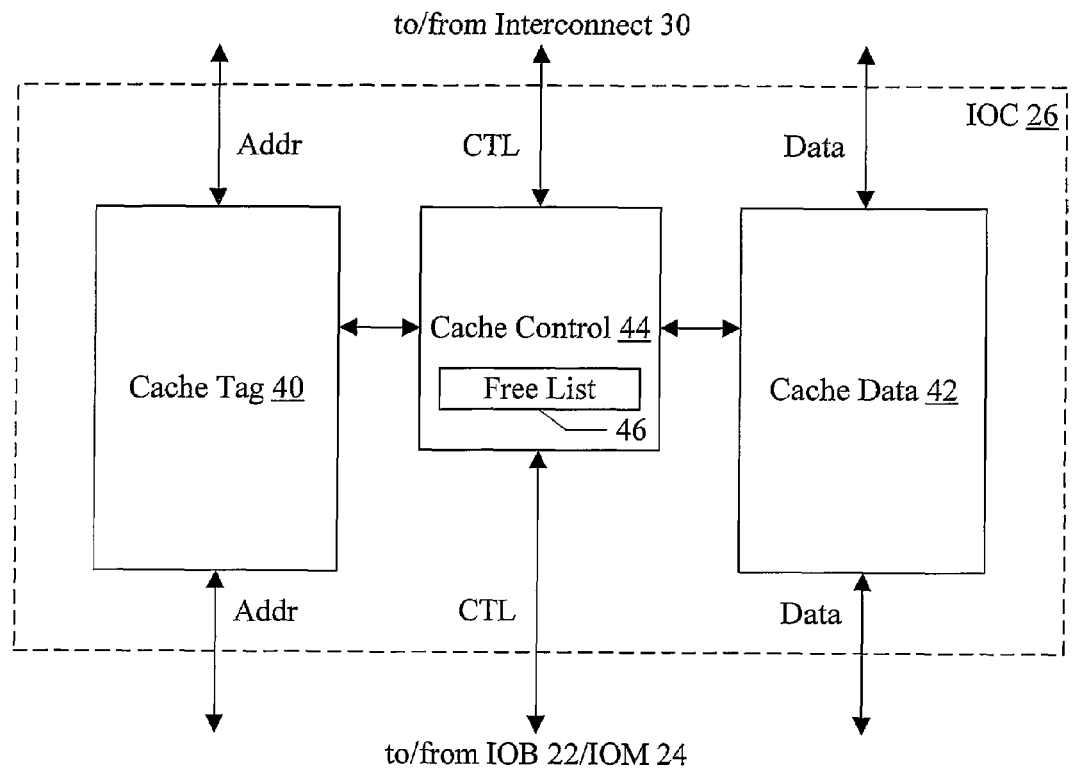
FIG. 2 is a block diagram of one embodiment of an IOC shown in FIG. 1.
FIG. 3 is a table illustrating allocation of data entries in one embodiment of the IOC.

Turning now to FIG. 2, a block diagram of one embodiment of the IOC 26 is shown in more detail. The IOC 26, in the embodiment of FIG. 2, includes a cache tag memory 40, a cache data memory 42, and a cache control unit 44. The cache control unit 44 includes a free list 46. The cache tag memory 40 is coupled to receive addresses for transactions on the interconnect 30 and to receive addresses for transactions from the IOB 22 (and received by the IOB 22 from the DMA controller 14 and/or the peripheral interface controller 32). The cache data memory 42 is coupled to receive data or provide data for the transactions from the interconnect 30 and the IOM 24. The cache control unit 44 is coupled to the tag memory 40 and the data memory 42, and to receive various control information related to the transactions received in the IOC 26.

The data memory 42 may comprise a set of data entries, each having capacity to store a cache block of data. The data memory 42 may comprise a RAM, for example, indexed by entry number. The cache tag memory 40 may comprise a set of tag entries, each configured to store an address tag and other state related to its corresponding data entry. The cache tag memory 40 may also comprise a RAM. Alternatively, the cache tag memory 40 may comprise a content addressable memory (CAM) for snooping purposes, or a RAM/CAM combination.

The cache control unit 44 may dynamically allocate a data entry in the data memory 42 to store data for a transaction received by the IOC 26. The transaction may be an I/O write to memory, for example, received from the IOB 22/IOM 24. The transaction may also be a read completion (with data) provided from the IOB/IOM 24 in response to a read previously received from the interconnect 30 and targetting I/O. The transaction may be a write received from the interconnect 30 that targets I/O. Additionally, the transaction may be a read completion for a read from an I/O device to memory.

The transaction may be considered either cacheable or non-cacheable, but a data entry may be provided in the data memory 42 in either case. If the transaction is non-cacheable (either because of the type of transaction, software-controlled restrictions such as translation attributes, or due to IOC 26 caching policies), the allocated entry is used as a buffer. If the transaction is cacheable and a cache miss, the allocated entry is used as a cache entry. If the transaction is cacheable and a cache hit, an entry is not allocated and the hitting entry may be updated (or data may be provided from the hitting entry). Thus, at any given point in time, a given data entry in the data memory 42 may be serving as a cache entry or as a staging buffer entry. That is, data entries are not statically assigned to buffer or cache use, in this embodiment.

In the illustrated embodiment, the cache control unit 44 implements a free list 46 to track which data entries are currently free and which are currently allocated. The free list 46 may comprise a free list value for each entry, which may indicate allocated or free. For example, the free list value may be a bit indicating allocated in one state (set or clear) and free in the other state. In such an embodiment, the free list may be a bit vector having a specified bit position for each data entry in the data memory 42. The free list 46 may comprise a register or other storage storing the free list value for each data entry.

The cache tag 40 stores tags for the cache blocks cached in the IOC 26, along with other cache state. For example, since the IOC 26 is maintained coherent on the interconnect 30, the cache state may include the various coherence states implemented in the coherence scheme on the interconnect 30. In one embodiment, a modified, exclusive, shared, invalid (MESI) or modified, owned, exclusive, shared, invalid (MOESI) scheme may be implemented. Other embodiments may implement any other scheme, or subsets of any scheme, as desired.

Staged data in the data memory 42 may not yet be coherent with the interconnect 30, or may not be coherent at all (e.g. data moving toward I/O). Accordingly, in this embodiment, the tag entries that correspond to data entries storing staged data may be marked invalid, even though the free list indicates that the data entry is allocated. Accordingly, the tag memory 40 may be snooped for coherence purposes, and no snoop hit will be detected for entries that are storing staged data. In general, each tag entry may include validity indication, comprising one or more bits per entry. For example, the validity indication may be a valid bit, indicating valid or invalid with set and clear states. Alternatively, the validity indication may be the cache state, with the invalid state indicating invalid and any other state (shared, exclusive, etc.) indicating valid. Any validity indication may be used. For the remainder of this disclosure, the cache state will be used as an example of a validity indication.

The combination of the cache state in the corresponding tag entry and the free list state for a data entry may indicate the current state of the data entry, in this embodiment. For example, the table in FIG. 3 illustrates the combinations of values and the corresponding current state of the data entry, for one embodiment. If the free list value for the data entry indicates free, then the data entry is not currently in use and is available to be allocated. The cache state is a don't care if the free list value indicates free, in this embodiment. If the free list value for the data entry is allocated and the cache state in the corresponding tag entry is invalid, the data entry is in use as a staging buffer. If the free list value for the data entry is allocated and the cache state in the corresponding tag entry is valid, then the data entry is in use as a cache entry.

The IOC 26 may have any configuration. Particularly, in one embodiment, the IOC 26 may be fully associative (in which any entry of the cache may be used to cache any address). Such a structure may be used, e.g., for relatively small capacities. For example, 128 entries may be implemented in a full associative configuration, in one embodiment. Both cache blocks and staging buffer entries may be freely allocated across the fully associative entries. For larger capacities of the IOC, timing and power consumption considerations may make the fully associative configuration less feasible. In such embodiments, a direct mapped or set associative configuration may be implemented.

In typical direct mapped and set associative caches, there is a preconfigured, one-to-one correspondence between tag entries and data entries. In a direct mapped configuration, each address maps to one possible entry (tag and data) in the cache, at which the corresponding cache block would be stored. If that entry was allocated to store staged data, then that entry could not be used to cache data until the staged data has been transmitted. Similarly, in a set associative configuration, each address maps to two or more possible entries (dependent on the associativity of the cache). However it is possible that all entries in a set could be allocated to staging buffer use. Performance may be impacted negatively in such cases, e.g. if the data that cannot be cached is frequently accessed.

Figure 4:
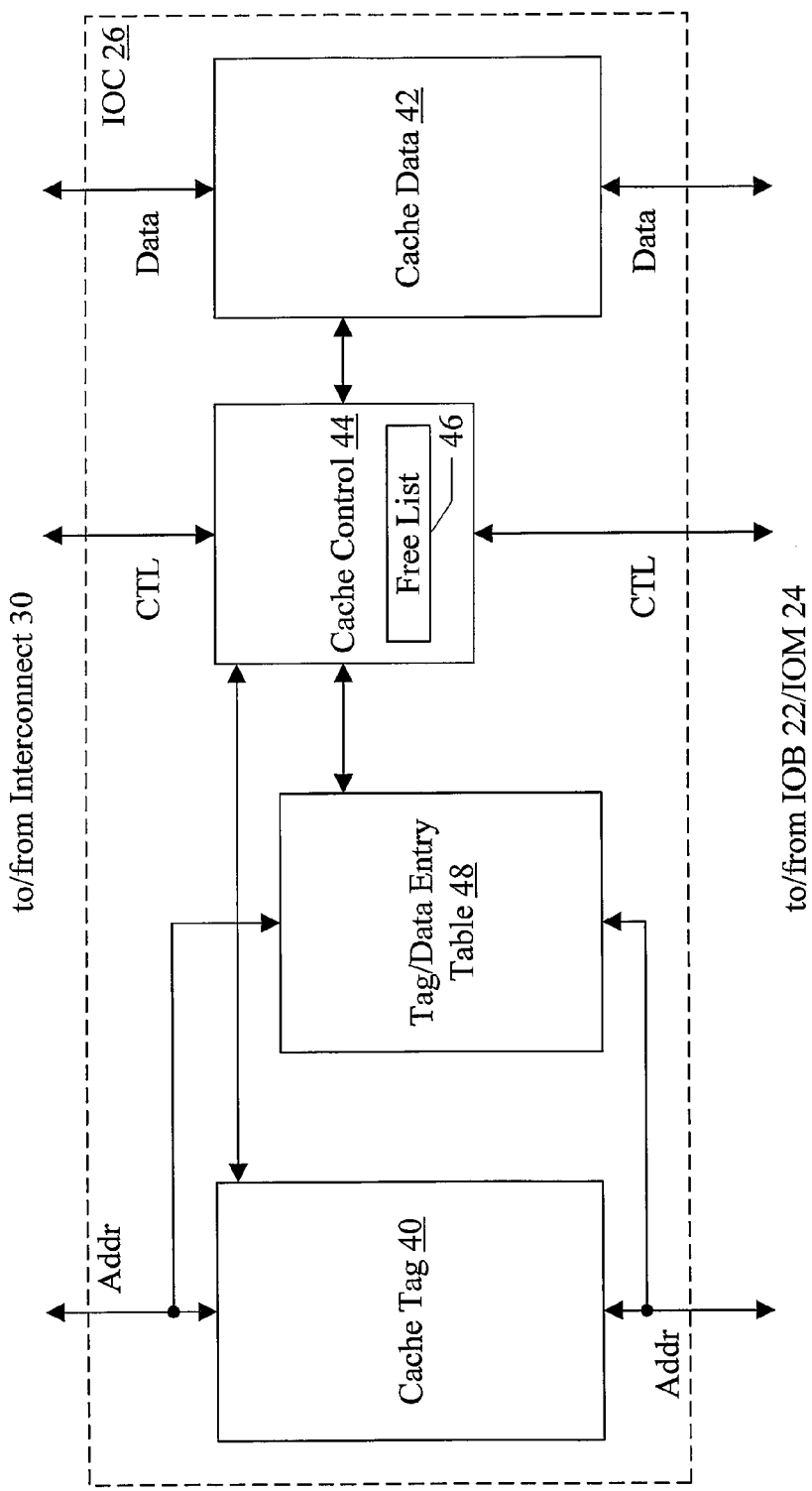
FIG. 4 is a block diagram of a second embodiment of the IOC.

FIG. 4 is block diagram of another embodiment of the IOC 26, including the cache tag memory 40, the cache data memory 42, and the cache control unit 44 (including the free list 46) as shown in the embodiment of FIG. 2 and coupled as shown in FIG. 2. Additionally, a tag/data entry table 48 is shown, coupled in parallel with the cache tag memory 40 to receive addresses of transactions and coupled to the cache control unit 44.

In the embodiment of FIG. 4, the tag/data entry table 48 may be used to map a given tag entry (and thus the address tag stored therein) to a cache data entry. Accordingly, the tag/data entry table 48 may provide the link between a tag entry and a data entry, rather then a fixed mapping. The table 48 may be updated by the cache control unit 44. The cache tag memory 40 may be designed as normal, having the configuration of the IOC 26 (e.g. direct mapped or set associative). The cache data memory 42 may have a different configuration (e.g. a RAM indexed by entry number). When a tag entry is allocated to a cache block to be stored in the IOC 26, the cache control unit 44 may allocate a data entry using the free list 46. The cache control unit 44 may update the tag/data entry table 48 to link the tag entry and the allocated data entry. When a data entry is allocated for staging buffer use, the tag/data entry table 48 may not be updated, and there may not be a tag entry for the corresponding data entry. Some cache entries may be unavailable for use, if all data entries are in use as staging buffers at the time a cache allocation is attempted. However, the flexible allocation of data entries may reduce the likelihood that a cacheable transaction is blocked from caching or causes other cache data to be evicted so that the newly received data can be cached.

In one embodiment, the tag/data entry table 48 is congruent with the cache tag memory 40 (that is, it has the same configuration in terms of rows and columns of entries). The table entry corresponding to a given tag entry may store a pointer to the data entry in the data memory 42 that is assigned to store the cache block that is tagged by the given tag entry. Thus, data entries may be freely allocated to cache blocks or staging buffers, as desired. The pointer may have any form, depending on the construction of the cache data memory 42. For example, the pointer may be an entry number, an entry number and way if the data memory is set associative, etc.

Figure 5:
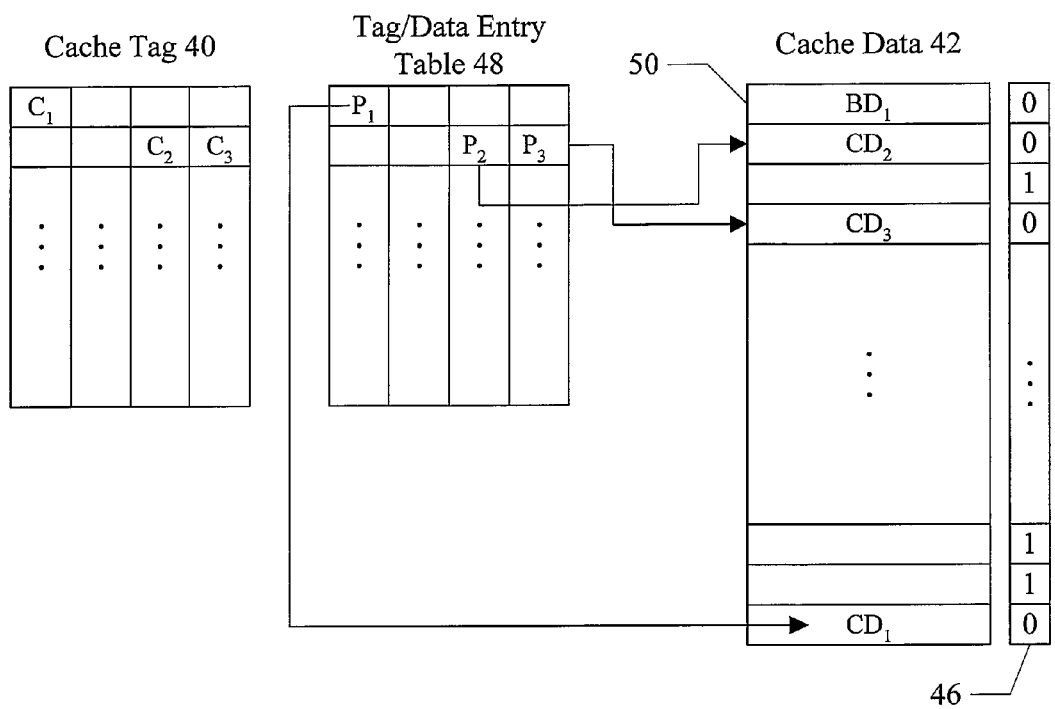
FIG. 5 is an example using an embodiment of FIG. 4.

FIG. 5 is an example illustrating the use of the tag/data entry table 48. In the example, the tag memory 40 (and thus the IOC 26) is 4 way set associative and the cache data memory 42 is a RAM indexed by entry number. Two sets of the cache tag memory 40 are shown, as are two corresponding rows of the tag/data entry table 48. In the example, there are three cache blocks represented by tags ($C_1$, $C_2$, and $C_3$ in FIG. 5). For each entry in the tag memory 40, a corresponding entry in the tag/data entry table 48 entry has a pointer to an entry in the data memory 42. Specifically, cache block $C_1$ has a corresponding pointer $P_1$, cache block $C_2$ has a corresponding pointer $P_2$, and cache block $C_3$ has a corresponding pointer $P_3$. As shown by the arrows in FIG. 5, each pointer may point to any entry in the cache data memory 42 (storing cache block $CD_1$, cache block $CD_2$, and cache block $CD_3$, respectively, in FIG. 5).

Additionally, a data entry is shown storing staged data ($BD_1$) in FIG. 5. The staged data occupies a data entry 50 in the data memory 42. Accordingly, the data entry 50 may be unavailable for allocation to store a cache block, until the staged data is transmitted. There is no pointer in the tag/data entry table 48 to the data entry 50, but the free list value for the entry shows allocated. In the example, the free list value is a bit, which is clear to indicate allocated and set to indicate available. The free list 46 is illustrated as a bit vector to the right of the data memory 42.

Accordingly, the cache control unit 44 may dynamically allocate any data entry for staging buffer or cache use, and may be permitted to cache data for any given index (and way) in the data memory 42 as well.

While the tag/data entry table 48 is shown separately in FIGS. 4 and 5, other embodiments may implement the table in the cache tag memory 42 (e.g. each tag entry may include the pointer to the allocated data entry). In some embodiments, portions of the IOC 26 may be integrated into the IOB 22. For example, the tag memory and cache controller may be integrated. In such embodiments, having the tag/data entry table 48 near the cache data memory 42 may be desirable, and thus a separate table may be implemented.

It is noted that the tag memory 42 has been described as storing an address tag. Any portion of the address may form the address tag, including all of the address. For example, in fully associative embodiments, all of the address may be stored (or all of the address except for the least significant bits that define an offset in a cache block). In direct-mapped or set associative embodiments, the address tag may exclude the portion of the address used as an index (and may also exclude the offset bits).

It is noted that, while the IOC 26 is described above as having entries that may be allocated as staging buffers or cache storage, other caches may implement similar functionality. For example, caches in the processors 18A-18B may implement such functionality. In such a cache, the source of transactions may be the processor core's load/store functionality, instead of various I/O devices (through the IOB/IOM, in the illustrated embodiment). Furthermore, the L2 cache 28 may implement such functionality.

Figure 6:
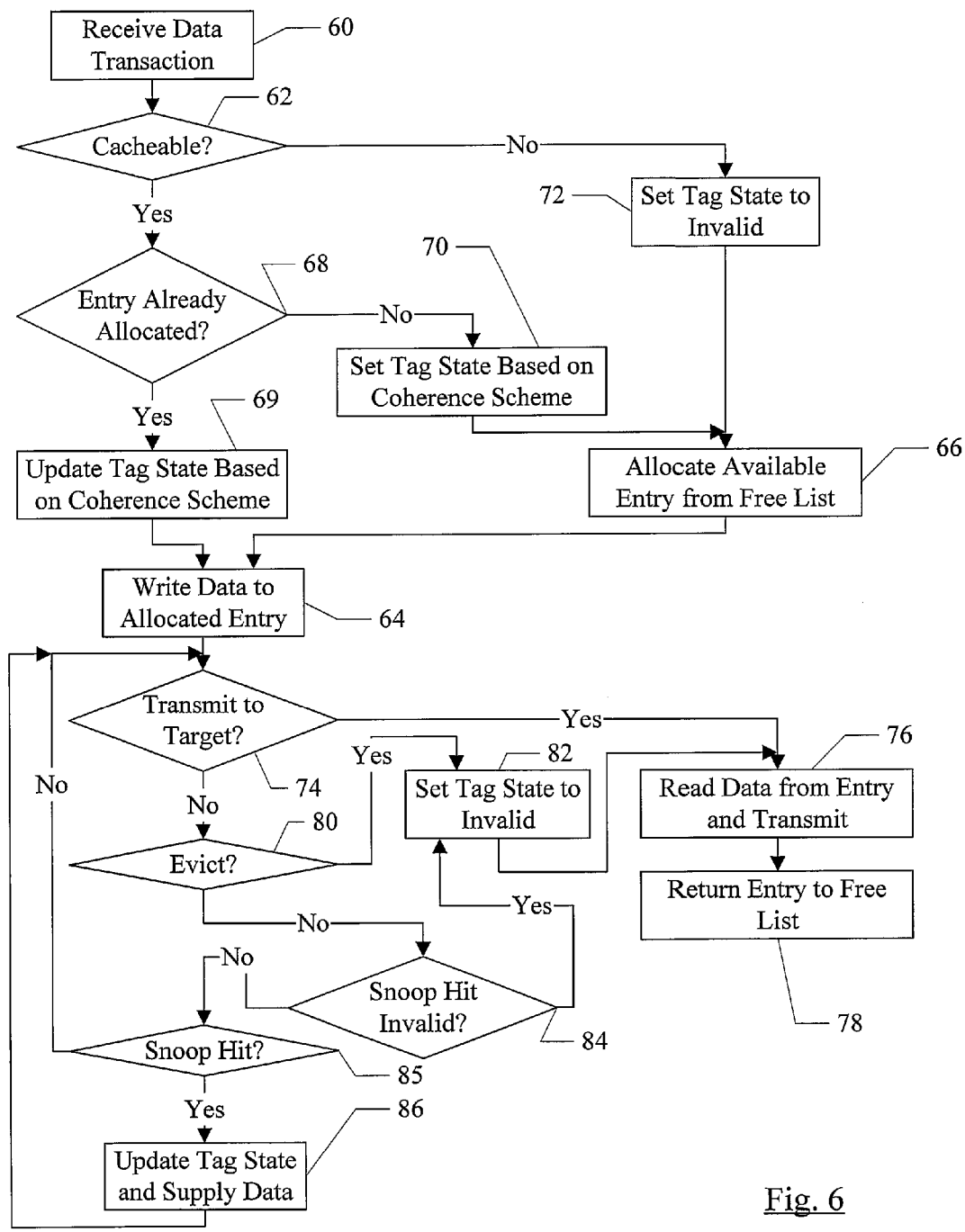
FIG. 6 is a flow diagram illustrating various operations of one embodiment of the IOC.

Turning now to FIG. 6, a flow diagram is shown illustrating various operations of the IOC 26 for one embodiment. The IOC 26, and more particularly the cache control unit 44, may comprise circuitry implementing the operation shown in FIG. 6. While the blocks are shown in a particular order for ease of understanding, other orders may be used. Blocks may be performed in parallel in combinatorial logic in the IOC 26/cache control unit 44. Blocks, combinations of blocks, and/or the flow diagram as a whole may represent multiple clock cycles of operation.

The IOC 26 may receive a transaction that includes data (e.g. from the interconnect 30 or from an I/O device—block 60). If the transaction is not cacheable (decision block 62, "no" leg), the allocated entry is being used as a staging buffer and thus the tag may be set to invalid (block 72). The IOC 26 may allocate an entry from the free list (block 66), updating the free list to indicate that the entry has been allocated. Additionally, the IOC 26 may write the transaction data to the allocated entry (block 64). If the transaction is cacheable (decision block 62, "yes" leg) and if a data entry has already been allocated for the transaction (decision block 68, "yes" leg), the IOC 26 may update the tag state in the entry based on the coherence scheme implemented on the interconnect 30 (block 69) and may write the data to the allocated entry (block 64). The tag state may depend on various responses to the transaction, such as snoop responses, responses to probes, etc. A block may already have been allocated for the data if the transaction is cacheable and hits in the cache, or if the data is a fill for a previous cache miss. Additionally, in some embodiments, an entry may already have been allocated if a previous transaction having data within the boundaries of the same cache block has been provided, and merging of the transactions is permissible. For example, write transactions are mergeable in some systems.

If the transaction is cacheable (decision block 62, "yes" leg) and an entry has not already been allocated (decision block 68, "no" leg), the IOC 26 may set the tag state of a tag entry based on the coherence scheme implemented on the interconnect 30 (block 70) and may allocate an available entry from the free list (block 66). The IOC 26 may update the free list to indicate that the entry has been allocated. As mentioned previously, data may be cacheable or uncacheable according to transaction type, software constraint, or policy of the IOC 26. In some embodiments, the decision of whether or not to cache a given block may be deferred until the data entry is ready to be freed. For IS example, a write operation that writes less than a cache block, and is merged in the IOC 26 into a cache block of data read from memory, may be retained in the cache to permit additional writes to occur. An I/O write of a complete data block, on the other hand, may be written to memory and deallocated from the cache.

If the IOC 26 detects that staged data is ready to be retransmitted to its target (decision block 74, "yes" leg), the IOC 26 may read the staged data from the data entry and transmit the data (block 76). The IOC 26 may return the data entry to the free list (block 78). That is, the IOC 26 may update the free list 46 to indicate that the data entry is available. The target for the data may be on the interconnect 30, or may be an I/O device communicating through the IOB 22/IOM 24, depending on the direction that the data is traveling.

If the IOC 26 detects that a cache block is to be evicted (decision block 80, "yes" leg), the IOC 26 may set the tag state to invalid (block 82). If the evicted cache block is modified, the tag state may be set to invalid once the evict-writeback transaction has been address-ordered on the interconnect 30. Thus, the data entry storing the evicted data may be converted to a staging buffer. If the evicted cache block is modified, the IOC 26 may read the data from the entry when the data is ready to be transmitted on the interconnect 30 and may transmit the data (block 76). The data entry is also returned to the free list (block 78).

The IOC 26 may also snoop coherent transactions from the interconnect 30. Since data entries currently in use as staging buffers either have an invalid corresponding tag entry (or no tag entry at all, in the case of the embodiment of FIG. 4), no snoop hit will be detected on such entries. If a snoop hit is detected that causes the tag to be invalidated (decision block 84, "yes" leg), the IOC 26 may set the tag state to invalid (block 82). If the data is to be provided by the IOC 26 in response to the snoop, the IOC 26 may read the data from the entry and transmit it on the interconnect 30 (block 76). In some cases, the data is not provided (e.g. an invalidate transaction, used when the source of the invalidate is going to overwrite the cache block). The IOC 26 may return the entry to the free list (block 78). In some cases, the return to the free list may be delayed (e.g. if the data still needs to be forwarded, such as a read completion to an I/O device). If a snoop hit is detected that does not cause the tag to be invalidated (decision block 85, "yes" leg), the IOC 26 may update the tag state in accordance with the coherence scheme implemented by the interconnect 30 and may supply the data in response to the snoop, if necessary (block 86).

Not shown in FIG. 6 is the cacheable read cache hit case. If a read transaction from an I/O device hits in the IOC 26, the IOC 26 provides data from the hitting entry.

Numerous variations and modifications will become apparent to those skilled in the art once the above disclosure is fully appreciated. It is intended that the following claims be interpreted to embrace all such variations and modifications.

What is claimed is:

1. A cache comprising:
   a data memory comprising a plurality of data entries, each data entry having capacity to store a cache block of data;
   a cache control unit coupled to the data memory, wherein the cache control unit is configured to dynamically allocate a given data entry in the data memory to store a cache block being cached or to store data that is being staged for retransmission on an interface to which the cache is coupled, and wherein the cache control unit comprises a free list, and wherein the cache control unit is configured to use the free list to track which data entries in the data memory are currently allocated and which are currently free, and wherein the cache control unit is configured to update the free list to indicate that the given data entry is currently allocated responsive to allocating the given data entry; and
   a tag memory coupled to the cache control unit, wherein the tag memory comprises a plurality of tag entries configured to store address tags corresponding to data in the data memory and validity indications, and wherein a combination of the free list value for the given data entry and the validity indication in the tag memory for the given data entry indicate a current state of the given data entry.

2. The cache as recited in claim 1 wherein, if the free list value indicates that the given data entry is free, the given data entry is available for allocation.

3. The cache as recited in claim 1 wherein, if the free list value indicates that the given data entry is allocated and the validity indication indicates invalid, the given data entry is allocated to store staged data.

4. The cache as recited in claim 3 wherein the interface is a coherent interconnect, and wherein the tag memory is snooped to maintain coherency, and wherein a snoop hit is not detected on staged data since the tag is marked invalid.

5. The cache as recited in claim 1 wherein, if the free list value indicates that the given data entry is allocated and the validity indication indicates valid, the given data entry is allocated to store a cache block.

6. The cache as recited in claim 1 wherein the validity indication comprises a cache state including at least an invalid state and a shared state.

7. The cache as recited in claim 1 wherein the cache control unit is configured to update the free list to indicate that the given data entry is currently free if the given data entry is storing staged data and the staged data has been retransmitted.

8. The cache as recited in claim 1 wherein, if the given data entry is storing cache data and the cache data is evicted, the cache control unit is configured to set the validity indication in the tag memory to invalid to convert the given data entry from a cache entry to a staging buffer.

9. The cache as recited in claim 8 wherein the cache control unit is configured to update the free list to indicate the given data entry is currently free responsive to transferring the evicted data.

10. The cache as recited in claim 1 further comprising a table that maps the tag entries in the tag memory to the data entries in the data memory, wherein the cache control unit is configured to create the mapping responsive to allocating a data entry for cache block storage.

11. The cache as recited in claim 10 wherein the table is congruent to the tag memory.

12. The cache as recited in claim 1 wherein the cache is coupled to a second interface, and wherein the cache is configured to receive the staged data for retransmission from the second interface.

13. The cache as recited in claim 12 wherein the cache is configured to receive data from is the interface for retransmission on a second interface, and wherein the cache is configured to allocate a data entry to store the data.

14. A method comprising:
   receiving data in a cache, the data being staged for retransmission on an interface to which the cache is coupled;
   dynamically allocating a given data entry in a data memory of the cache to store the staged data, the given data entry having a capacity to store a cache block being cached and also useable to cache the cache block;

tracking which of the data entries in the data memory are currently allocated to either cache blocks or staged data and which entries are free in a free list, the tracking comprising updating the free list to indicate that the given data entry is allocated to the staged data;

maintaining cache tags for the data entries in a tag memory that comprises a plurality of tag entries configured to store address tags corresponding to data in the data memory and validity indications, wherein a combination of validity indication in the tag memory for the given data entry and a state in the free list indicates whether the given data entry is storing staged data or a cache block.

15. The method as recited in claim 14 wherein the given data entry being available for allocation is indicated by the free list value indicating that the given data entry is free.

16. The method as recited in claim 15 wherein the given data entry being allocated to store staged data is indicated by a combination of the free list value indicating that the given entry is allocated and the validity indication indicating invalid.

17. The method as recited in claim 16 wherein the given data entry being allocated to store a cache block is indicated by a combination of the free list value indicating that the given entry is allocated and the validity indication indicating valid.

* * * * *